United States Patent [19]

Johnson et al.

[11] 4,105,530

[45] Aug. 8, 1978

[54] CORROSION RESISTANT ELECTRODES FOR ELECTROCHEMICAL USE

[75] Inventors: Alan Stanley William Johnson, Wantage; Alfred Chan Chung Tseung, London, both of England

[73] Assignee: National Research Development Corporation, London, England

[21] Appl. No.: 423,286

[22] Filed: Dec. 10, 1973

[30] Foreign Application Priority Data

Dec. 13, 1972 [GB] United Kingdom ............... 57397/72

[51] Int. Cl.$^2$ ............................................. C25B 11/00
[52] U.S. Cl. .............................. 204/290 R; 204/290 F; 427/103; 427/93; 252/518; 252/519; 338/244; 338/262
[58] Field of Search ............... 117/212, 231, 221, 223; 252/518, 519, 520; 204/290 R; 174/102 SC, 105 SC; 338/244, 262; 427/61, 103, 115, 87

[56] References Cited

U.S. PATENT DOCUMENTS

| | | | |
|---|---|---|---|
| 2,735,824 | 2/1956 | Haaymann et al. | 252/519 |
| 2,797,175 | 6/1957 | Horton | 252/519 |
| 3,044,901 | 7/1962 | Garnsworthy | 252/518 |
| 3,046,434 | 7/1962 | Schurecht | 117/223 |
| 3,491,014 | 1/1970 | Bianchi et al. | 204/242 |
| 3,657,102 | 4/1972 | Keith et al. | 204/290 F |
| 3,657,102 | 4/1972 | Keith et al. | 204/290 F |
| 3,661,239 | 5/1972 | Tomilov et al. | 204/73 A |

*Primary Examiner*—John D. Welsh
*Attorney, Agent, or Firm*—Carroll F. Palmer

[57] ABSTRACT

An electrode suitable for use in corrosion conditions is formed with its exposed surface composed of a substantially pore-free material consisting of an acid-resistant, semi-conducting oxide material in a fused glass. Titanium-doped ferric oxide semi-conducting material in a soda-glass or boro-silicate glass is preferred.

11 Claims, 3 Drawing Figures

CORROSION RESISTANT ELECTRODES FOR ELECTROCHEMICAL USE

This invention relates to corrosion-resistant electrodes for electrochemical use. Particular use may be found for such electrodes, in, for example, cathodic protection of metals, electrowinning of metals, electroplating and electrochemical synthesis.

The present invention provides a body or material suitable for use as a corrosion-resistant electrode for an electrochemical process, in which the electrode surface of said body or material is substantially pore-free and consists of an acid-resistant, semi-conducting oxide material in a fused glass. Said electrode surface may be that of a layer not more than about 1 mm thick of said semi-conducting oxide material in said fused glass on at least a part of the surface of a substrate of conducting material. Lead oxide, which is highly conducting, can be used as the substrate but preferably the substrate is metallic and may consist of iron or a steel which is advantageous since these are relatively cheap materials.

The oxide in the surface material may consist of any suitable acid resistant, semi-conducting oxide, excluding the oxides of platinum, ruthenium, rhodium, palladium, rhenium, osmium and iridium since these are relatively costly, the main criteria being that the material should have reasonable conductivity and should enable the glass to provide, with the oxide, a substantially pore-free surface. The glass for the surface material may be any suitable acid resistant glass; soda-lime glasses or boro-silicate glasses are particularly suitable.

It has been found that a satisfactory electrode body can be formed using a titanium-doped ferric oxide as the semi-conducting oxide.

Cathodic protection is normally used for reducing the rate of corrosion on metals in aqueous environments. Such environments include sea water, water contained in soil, aqueous solutions in industrial condensers and heat exchangers, de-aerators, boilers and ancillary pipework, hot and cold water systems for dwellings and commercial buildings, hospitals, etc., including both supply water and water for central heating and air conditioning purposes, aqueous solutions or conducting liquids undergoing processing in chemical plants, and many other processes which are well documented. Some types of cathodic protection systems utilise inert anodes and an externally impressed direct electric current. It is in this sense that electrodes in accordance with the present invention should prove to be particularly useful. In such systems, the metal to be protected is immersed (or partly immersed) in an aqueous solution and is electrically connected to the negative pole of an external source of current and an inert anode such as may be provided by the present invention, also immersed (or partly immersed) in the aqueous solution, is connected to the positive pole of the external source of current. Under these conditions, electrons flow from the inert anode to the external current source, and from the external current source to the metal to be protected. The circuit is completed by movement of ions in the aqueous solution. The impressed current reduces the rate of corrosion of the metal to be protected, since the metal to be protected can only undergo cathodic reaction and not anodic reaction. Practical experience determines the potential to which it is necessary to reduce the potential of the metal to be protected; under service conditions it is frequently but not always necessary to reduce the potential to a value below the, so called, immunity potential.

At present anodes which are widely used in some of the applications mentioned above, for example, for the protection of ships' hulls and sea bed pipelines, consist of titanium coated with precious metals, or precious metal oxides, in some cases mixed with the oxides of other metals. By the use of the present invention it will be seen that anodes may be provided for the same purpose which are probably less expensive.

In another field of electrochemistry, a metal may be extracted from a solution containing the metal by cathodic deposition, using an inert anode at which gas is evolved; this process is known as electrowinning. The present invention provides corrosion resistant anodes which may be used as inert anodes in electrowinning processes.

Anodes in accordance with the present invention may also be used in electroplating processes as inert anodes for providing the current required for the cathodic metal deposition process, where acceptable concentration of the solution is maintained by salt additions to the solution.

Another use for electrodes in accordance with the invention is in electrochemical synthesis in aqueous and organic solutions, for example in the preparation of chlorine or certain oxy-compounds of chlorine, bromine, and sulphur, such for example, as sodium chlorate, perchlorates, persulphates. Many different types of anode are used at present in electrochemical synthesis processes. It is considered that a likely application of the electrodes to which this invention relates might be for the electrochemical treatment of effluents, for example, for the anodic oxidation of electroplating bath effluents, or for the chlorination of sea water for effluent treatment. Of course, electrodes in accordance with the invention may be used cathodically, if desired.

Previous proposals for the preparation of inert anodes for use in the known processes referred to above and other processes, have recognised the possibility of utilising semi-conducting oxide coatings on metal substrates. The principal advantage of coating a semi-conducting oxide on a metal substrate is that, because the current only has to pass through a relatively thin layer of semi-conducting oxide before reaching the highly conducting metal substrate, the possibility admits to utilise semi-conducting oxides with a relatively low electrical conductivity. Very few oxides have a sufficiently high electrical conductivity for a solid oxide electrode to conduct the current from the external circuit without a large ohmic loss within the material of the electrode. On this account, only magnetite and lead dioxide have found application as solid anodes.

Coating the semi-conducting oxide on a metal substrate which carries the current from the external circuit greatly increases the number of semi-conducting oxides which might be utilised as the electrode surface in contact with the electrolyte.

However, previously proposed processes for coating metal substrates with semi-conducting oxides have not proved to be commercially successful, except in the case of precious metal, and precious metal-containing, coatings on titanium, for three reasons:

(1) It is very difficult to obtain an adherent coating of oxide, except by techniques which are not economic, such as firing the coated metal to a high temperature, or by plasma-arc spraying.

(2) Even if a metal substrate which is inherently resistant to anodic dissolution, such as titanium, is used, it is difficult to obtain a bond between metal substrate and semi-conducting oxide coating which will prevent the anodic passivation of the metal substrate beneath the areas which are bonded to semi-conducting oxide. Thus, on titanium, a non-conducting layer consisting of nonconducting titanium dioxide forms beneath particles of semi-conducting oxide where the original bond was electrically conducting, and if the anode is held at a potential originally adequate to support the required current density, the current from the anode gradually decreases. In the case of precious metal-based coatings on titanium, this passivation process may, of course, take months or years, but passivation remains a possibility.

(3) In the case of metal substrates which are not inherently resistant to corrosion at the anodic potentials used in the electrochemical processes previously described, direct anodic dissolution of the metal may occur, in addition to the effect mentioned in (2). This can only be prevented by making the coating non-porous, which is technically difficult with coatings of semi-conducting oxides to metals.

It has now been found that by the addition of a glass to a semi-conducting oxide, in accordance with the invention, the above problems may be overcome.

Coatings in accordance with the invention may be applied by utilising a mixture of semi-conducting oxide and glass as coating material, and coating it on to the substrate by enamelling techniques, whereby the coating powder is dispersed over the surface of the substrate at low temperature and fired in a non-oxidising atmosphere, such as argon or nitrogen, to a high temperature to obtain an adherent coating. Alternatively, the coating powder can be applied by flame spraying techniques. The coating powder may be first densified on the substrate, before firing, by the application of a high pressure.

Alternatively dip-coating techniques may be used, whereby the substrate to be coated is dipped into a mixture of semi-conducting oxide and glass at high temperature to produce the coating in a suitable non-reactive atmosphere, such as a non-oxidising atmosphere.

A combination of dip-coating and enamelling may be used whereby the heated substrate is dipped into a heated fluidised bed or heated packed bed of semi-conducting oxide and glass powder and subsequently cooled or fired as may be required to produce a coating of the desired porosity; the process may, of course, be repeated to obtain thicker coatings if necessary, though it is probable that the thinner the pore-free coating the better, especially from the point of resistivity of the coating.

The addition of glass to the semi-conducting oxide serves to provide a means of causing the semi-conducting oxide to adhere to the substrate more readily than it would in absence of the glass. Moreover, the presence of the glass serves to prevent or minimise the anodic passivation of the substrate beneath the areas which are in electrical contact with the semi-conducting oxide. The glass also serves to make the coating non-porous, or less porous, and tends to minimise the anodic dissolution of the substrate.

In case the semi-conducting oxide reacts with the glass to form a semi-conducting glass, as is the case with iron oxide and glass, the glass so formed serves to make a better electrical connection between the semi-conducting oxide and an iron or steel substrate. However, not every semi-conducting oxide and glass mixture can be fired to produce a substantially pore-free layer.

In order that the invention may be more clearly understood, the results of tests of certain materials and of electrodes prepared using such materials in accordance with the invention will now be described with reference to the accompanying drawings.

Figure 1:
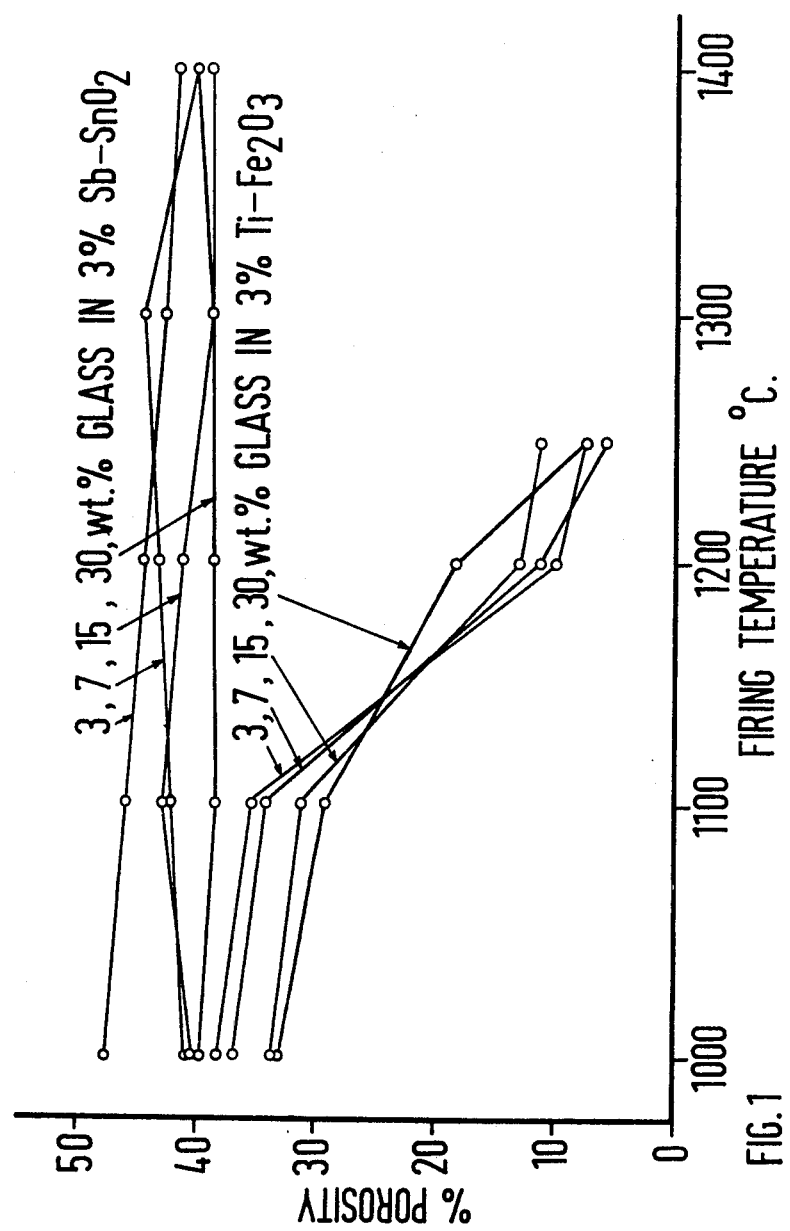
FIG. 1 illustrates the open porosity of pellets of glass semi-conducting oxide materials after 3 hours firing at 1000° C and successive 3-hour firings at higher temperatures, where the oxide is tin oxide doped with antimony or ferric oxide doped with titanium.

FIG. 1 shows the results of a set of experiments to determine the porosity of certain semi-conducting oxide-glass mixtures. Antimony-doped tin oxide was prepared from a solution of antimony and tin chlorides in dilute hydrochloric acid by precipitation of the hydroxides with excess ammonia. The precipitate was washed, dried and heated to 1000° C for 1 hour. The resulting antimony-doped tin oxide powder was then mixed with various proportions of powdered glass (supplied by British Drug Houses as 'glass powder', which comprised mainly soda-lime glass). Mixtures containing various proportions of glass were then pressed in a die, into pellets of about 1 inch diameter and fired in argon at progressively higher temperatures in air. After each firing, the porosity of each pellet was determined by weighing in air and in water, a method sensitive to closed pores, and by the method of calculating the volume from the measured thickness and diameter, which is sensitive to both open and closed pores. These tests showed that all of the antimony-doped tin oxide and glass pellets had high porosity. Titanium-doped ferric oxide was prepared from a solution of titanium and iron chlorides similarly by precipitation of the hydroxides using excess ammonia. Pellets composed of mixtures of titanium-doped ferric oxide and glass were then prepared and their porosities as a function of firings at progressively higher temperatures determined in the same way as for the antimony doped tin oxide and these results are also shown in FIG. 1.

In the case of the titanium doped ferric oxide and glass pellets, it was found that below about 8% porosity the results obtained by the first method are very similar to those obtained by the second method, indicating that most of the pores are closed, and not open pores; in other words these pellets are impervious to liquid.

Figure 2:
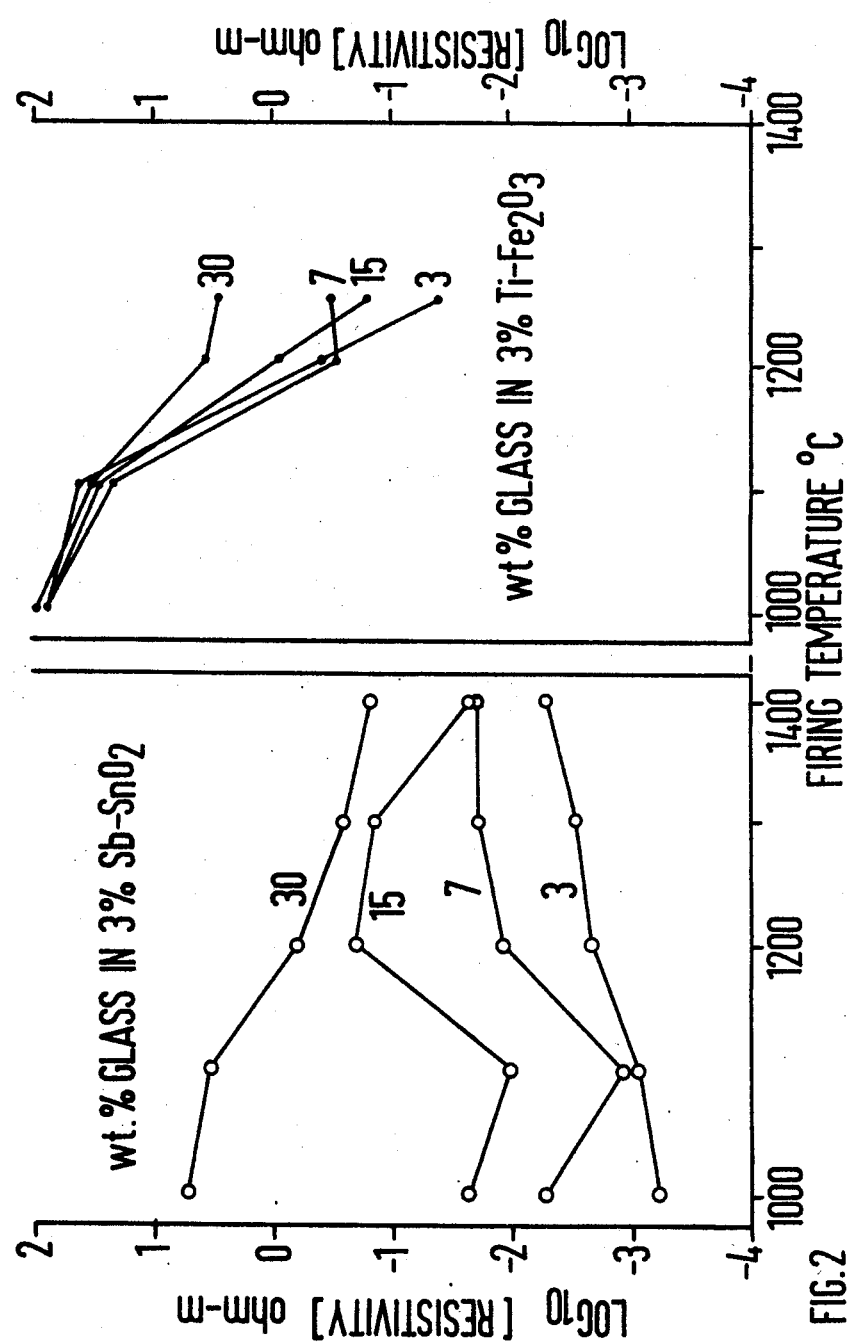
FIG. 2 shows the variation of values of resistivities of the two mixtures referred to in FIG. 1, after heating for similar successive periods of 3 hours at increasingly higher temperatures above 1000° C.

FIG. 2 shows the results of a second set of experiments to determine the resistivity of semi-conducting oxide-glass mixtures. The resistivity of pellets consisting of mixtures of antimony-doped tin oxide and glass, and the resistivity of pellets consisting of mixtures of titanium-doped ferric oxide and glass were determined by the well-known four point probe method. The pellets were prepared as described previously and were fired to progressively higher temperatures.

Figure 3:
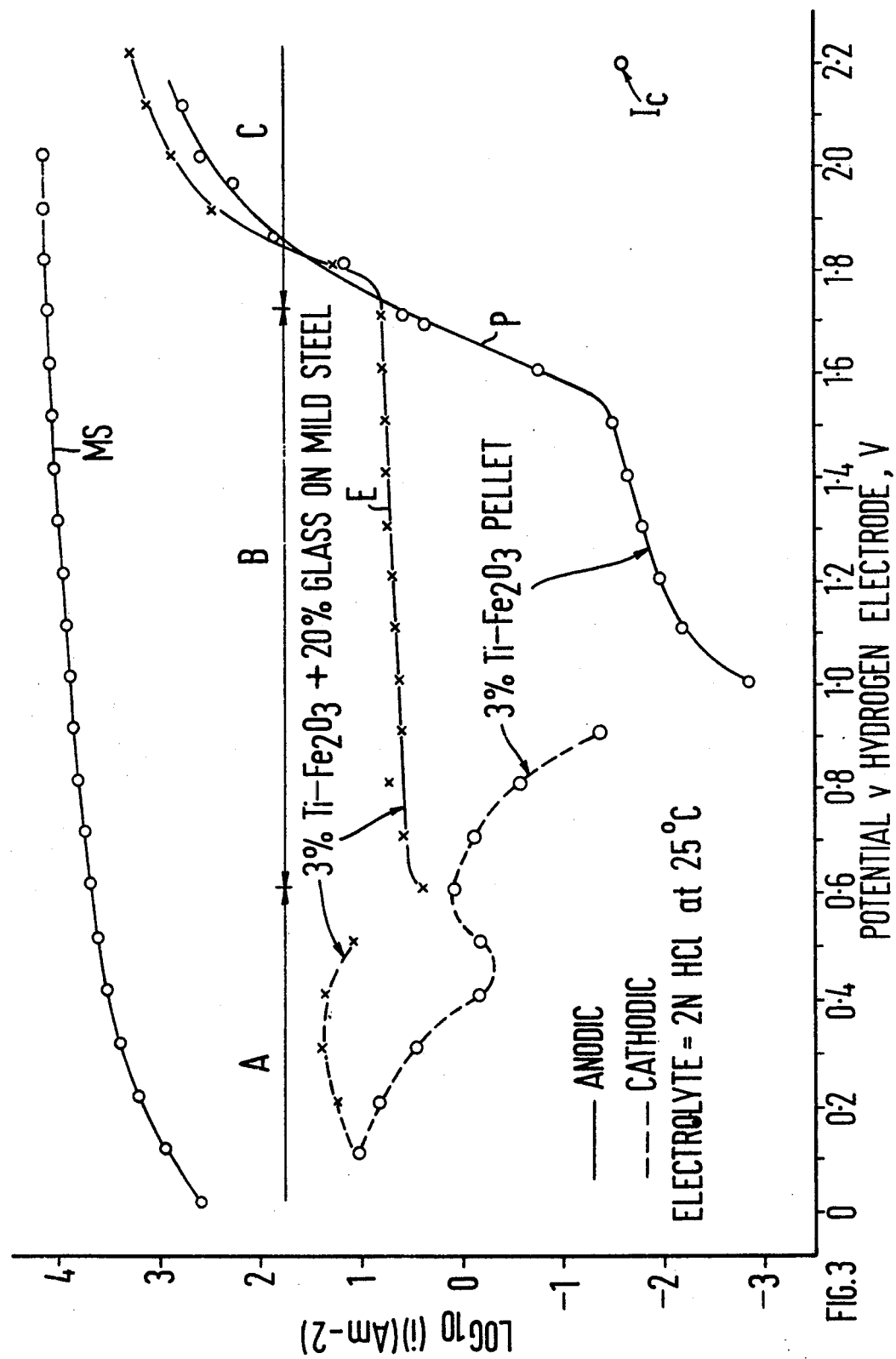
FIG. 3 shows the results of polarisation measurements on an electrode of mild steel, on a pellet of titanium-doped ferric oxide and on an electrode having an electrode surface of titanium-doped ferric oxide and a glass.

FIG. 3 shows the results of tests to demonstrate the use of mild steel as a suitable conducting substrate for coating with a mixture of a semi-conducting oxide (Ti—$Fe_2O_3$) and a glass such as above described thus rendering a mild steel body suitable for use as a substantially inert corrosion-resistant anode for electrochemical applications.

Anodic polarisation measurements were made for comparative purposes on a mild steel electrode in 2N hydrochloric acid and on a pellet of titanium-doped ferric oxide in 2N hydrochloric acid; the results are illustrated in curve MS and curve P respectively. This pellet was prepared by pressing 3% titanium-doped ferric oxide powder in a die and firing in argon at 1300° C for 2 hours. Anodic polarisation measurements were also made on an electrode consisting of a mild steel substrate coated with a mixture of the titanium-doped ferric oxide and glass, the results being indicated by curve E. This electrode was prepared as follows. Appropriate quantities of 3% titanium-doped ferric oxide powder and glass powder were mixed, and pressed in a die to give a pellet approximately 1 inch diameter and 1 mm thick. This pellet was placed on a piece of mild steel sheet approximately 1 mm thick, and fired in argon to 1250° C for 5 minutes in an argon atmosphere. There resulted a black lustrous coating, about 10 sq. cm. in area and approximately 0.5 mm thick, strongly bonded to the substrate. A portion of the coated area of steel was cut out using a diamond saw, connected to a wire on the non-coated face using silver-araldite as a contact material, and encapsulated in araldite resin except for the semi-conducting oxide-glass coated face; this constituted the electrode for the tests resulting in curve E.

FIG. 3 also shows the result of an experiment to determine the corrosion rate of titanium-doped ferric oxide under conditions of chlorine evolution of 1000 A/$m^2$. Chlorine was evolved on a titanium-doped ferric oxide pellet at this current density for 50 hours, and the solution was then analysed for iron content. The corrosion current calculated from the quantity of iron found in the solution is marked as the point $i_c$ on FIG. 3. On this basis it may be calculated that a coating 1 mm thick should, operating at a current of 1000 A/$m^2$, last approximately 5 years.

This indicates that the electrodes above described, with the coating of 3% titanium-doped ferric oxide and glass, would be capable even of functioning for long term as anodes in cells wherein chlorine is evolved at the anode. It also indicates that on a passivating substrate such as titanium, which is intrinsically resistant to anodic dissolution and does not require a completely pore-free coating, a longer anode life would be expected.

Experiments have also been carried out in which pellets of other semi-conducting oxide-glass mixtures were fired on metal substrates to obtain a qualitative assessment of the coatings. Magnetite mixed with 20% glass fired on mild steel at 1250° C in an inert atmosphere gave a coating similar to that obtained with 3% titanium-doped ferric oxide plus 20% glass, but containing some pores. Antimony-doped tin oxide plus 20% glass fired on mild steel at 1250° gave a coating of poor quality which cracked off on cooling.

It has been noted that 3% titanium-doped ferric oxide plus 20% glass fired on steel for 30 min. at 1250° C also gave a black coating relatively free of open pores.

Some experiments were carried out in which pellets of semiconducting oxide containing no glass were fired on steel at 1250° C. Antimony-doped tin oxide and titanium-doped ferric oxide did not adhere to the steel. Magnetite produced an adherent coating, but of inferior quality to that obtained with 20% glass added. All these experiments in which pellets were fired on metal substrates were carried out in an argon atmosphere.

We claim:

1. A method of making a corrosion-resistant electrochemical electrode using a substrate of electrically conducting base material which comprises:

applying to the surface of said substrate a layer of a mixture of an acid-resistant, semi-conducting oxide material and an acid-resistant glass of melting point below that of said oxide material and said base material, said oxide material and said glass being selected to cause said coating to be substantially non-porous while being semi-conducting and causing the glass in said mixture at some stage of application thereof on the surface of said substrate to become molten whereby a non-porous coating consisting of said glass and oxide material becomes adhered to said substrate.

2. A method of making a corrosion-resistant electrochemical electrode using a substrate of electrically conducting base material, which comprises forming on the surface of said substrate an adherent coating of a mixture of an acid-resistant, semi-conducting oxide material and an acid-resistant glass of melting point below that of said oxide material and said substrate material, both said oxide material and said glass being in powder form, and being selected to cause said coating to be substantially non-porous while being semi-conducting to form the surface of the electrode, the glass in said mixture having become molten at some stage in the formation of the coating.

3. A method of making a corrosion-resistant electrode using a substrate of electrically conducting ferrous metal which comprises:

dispersing over the surface of a substrate formed of ferrous metal having the shape required for said electrode a layer of a mixture of powdered semi-conducting metal oxide selected from the group consisting of titanium-doped ferric oxide and antimony-doped tin oxide and powdered glass selected from the group consisting of soda-lime glass and boro-silicate glass and firing the resulting substrate and layer in a non-reactive atmosphere to fuse said glass in the layer forming an adherent non-porous coating upon the substrate.

4. The method of claim 3 wherein said mixture consists of about 80% metal oxide and 20% glass.

5. The method of claim 3 wherein said mixture layer is densified on said substrate surface by application of pressure before said firing.

6. The method of claim 4 wherein the doping content of the metal oxide is about 3 percent.

7. The method of claim 1 wherein said base material is a ferrous metal.

8. The method of claim 7 wherein said ferrous metal is iron or steel.

9. The method of claim 7 wherein said mixture consists essentially of powdered metal oxide selected from the group consisting of titanium-doped ferric oxide, antimony-doped tin oxide and magnetite and powdered glass selected from the group consisting of soda-glass and borosilicate glass.

10. The method of claim 9 wherein said mixture is about 80% metal oxide and 20% glass.

11. A method of making a corrosion-resistant electrode which comprises:

charging a flame spray gun with a mixture of powdered semi-conducting metal oxide selected from the group consisting of ferric oxide and tin oxide and powdered glass selected from the group consisting of soda-glass and boro-silicate glass, said glass constituting up to 30 percent by weight of said metal oxide, positioning a substrate formed of electrically conducting ferrous metal in a position to receive material sprayed from said spray gun, and flame spraying said mixture from said spray gun onto said substrate forming on at least a part of the surface thereof an adherent, substantially pore-free layer up to substantially 1 mm. thickness of semi-conducting metal oxide in a matrix of fused glass.

* * * * *